March 3, 1942.　　M. F. PETERS ET AL　　2,274,735
APPARATUS FOR DETERMINING THE POSITION OF THE
CONDUCTOR IN ELECTRICAL CABLES
Filed Oct 18, 1938

INVENTORS
MELVILLE F. PETERS
BY THEODORE B. GODFREY
ATTORNEY

Patented Mar. 3, 1942

2,274,735

UNITED STATES PATENT OFFICE 2,274,735

APPARATUS FOR DETERMINING THE POSITION OF THE CONDUCTOR IN ELECTRICAL CABLES

Melville F. Peters, Beltsville, and Theodore B. Godfrey, Bethesda, Md.

Application October 18, 1938, Serial No. 235,700

3 Claims. (Cl. 177—311)

(Granted under the act of March 3, 1883, as amended April 30, 1928; 370 O. G. 757)

This invention relates to devices for determining the position of the conductor in electrical cables, and more particularly to an apparatus that depends upon a capacitance method for making such determinations.

It is highly desirable that the conductor of an electrical cable be positioned in the center of its surrounding insulation, especially if the cable is intended for an exacting purpose, such as the ignition circuits of automobile or aviation engines.

If several electrodes, preferably of the same shape, are disposed about a cable containing an electrical conductor, the capacitances between the electrodes and the conductor depend upon the position of the conductor, and its position may be deduced from the relative values of the capacitances, provided there is no angular variation in the overall dielectric constant of the insulating material of the cable. If the electrodes are of identical shape and are disposed symmetrically about the cable, the capacitances are all equal when the conductor is at the center of the cable.

One of the objects of this invention is to provide an apparatus that will determine whether or not the conductor in a cable is properly centered.

Another object of the invention is to provide an apparatus that will indicate visually to the operator of the apparatus, whether the conductor of a cable is centered, or in what direction and approximately to what extent it is off center.

A further object of this invention is to provide an apparatus that may be used to actuate means for marking portions of a cable wherein the conductor is off-center, or for controlling the position of the conductor as the cable is being extruded.

A still further object of the invention is to provide an apparatus that may be used to actuate a recording means for showing the position of the conductor along the length of the cable.

With such objects in view, as well as other advantages which may be incident to the use of the apparatus, the invention consists of the parts and combinations thereof hereinafter set forth and claimed, with the understanding that the several necessary elements constituting the same may be varied in proportion and arrangement without departing from the nature and scope of the invention, as defined in the appended claims.

Figure 1:
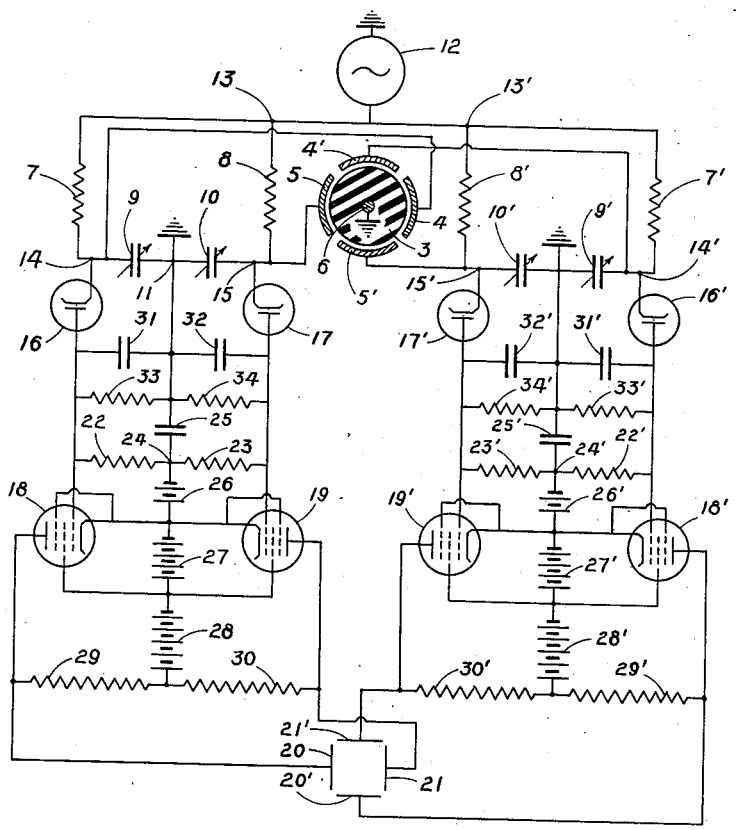
Fig. 1 is a schematic wiring diagram showing the preferred arrangement of our apparatus.

Referring to the drawings, there is shown in Fig. 1 a cross-section through a cable 3, and electrodes 4, 5, 4' and 5', spaced about the cable 3. The electrodes 4, 5, 4', 5', are approximate quadrants of a cylindrical shell of a convenient length. To test a length of the cable 3, its conductor 6 is grounded, and the cable 3 is drawn through the electrodes 4, 5, 4', 5', which are held stationary.

Figure 2:
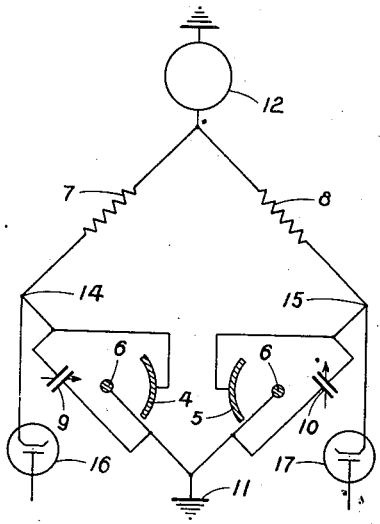
Fig. 2 is a wiring diagram of one of the impedance bridges of the circuit of Fig. 1, shown in a more conventionalized form.

The upper part of the electrical circuit shown in Fig. 1 consists of two impedance bridges, the arms of the bridge on the left being the resistors 7 and 8, and the capacitances between electrodes 4 and 5 and the conductor 6 of the cable 3. Connected in parallel with the capacitances are the small variable capacitors 9 and 10 which are inserted for balancing the bridge, since stray capacitances in the wiring of the bridge will not usually balance out. The bridge is grounded at point 11. In Fig. 2 this bridge is shown in the more conventional form, like reference characters being used. The bridge on the right of Fig. 1 is made up of the same components as are present in the bridge on the left, corresponding parts being designated by the same number primed.

The two bridges have a common source of alternating power 12, which may be a vacuum tube oscillator. It is connected to the bridges at the points 13 and 13'. The frequency of the oscillator 12 and the resistance of resistors 7, 8, 7' and 8', are best fixed at such values that the condition for maximum variation in potential at points 14, 15, and 14', 15', with variations in capacitances of electrodes 4, 5, 4', 5', respectively, is fulfilled, namely, that for any one side of a bridge, such as, for example, those components included between the points 13, 14 and 11 of the bridge on the left, $RC\omega=1$ where R is the resistance 7, C is the capacitance in the arm between points 14 and 11, and $\omega$ is equal to $2\pi f$, $f$ being the frequency of the oscillator 12.

The alternating potentials of points 14, 15, 14', 15' are rectified by rectifiers 16, 17, 16', 17', respectively. Vacuum tube rectifiers are indicated in the drawing, but rectifiers of other types may be used. The rectified potentials originating in the bridge on the left of the diagram are differentially amplified by amplifying tubes 18 and 19. The rectified potentials originating in the bridge on the right are differentially amplified by amplifying tubes 18' and 19'. The bridge arrangement of the amplifying tubes aids in keeping the indications independent of fluctuations in plate supply and heater voltages. Amplification of the voltages is not essential to the circuit, but for cable such as is used in ignition circuits for automobile and aviation engines, with electrodes about six inches long, and an oscillator of ordinary voltage output, one stage of amplification is advisable if it is desired to detect readily a displacement of a conductor from the center of a cable by an amount equal to 10% of the radius of the cable.

The rectified and amplified voltage from point 14 controls the potential of deflection plate 20 of a cathode-ray oscillograph. Similarly, the potentials of deflection plates 21, 20', 21' are determined by the potentials at points 15, 14', 15' respectively. Since the potentials at points 14, 15, 14', 15' depend upon the capacitances of electrodes 4, 5, 4', 5' respectively, the potential of each deflection plate is a function of the capacitance between one of the electrodes and the conductor 6 of the cable 3.

The polarities of the rectifiers 16, 17, 16', 17' and the connections to the deflection plates 20, 21, 20', 21' of the oscillograph are so arranged that the fluorescent spot on the screen of the oscillograph moves in the same direction as the conductor 6 when it moves from the central position within the cable 3. Thus, in the diagram, when the conductor 6 moves toward electrode 5, the capacitance of electrode 5 is increased and the potential of plate 21 is decreased; the capacitance of electrode 4 is decreased and the potential of plate 20 is increased. Therefore the cathode-ray is deflected away from plate 21 and toward plate 20, that is, it moves in the same direction as the conductor 6. Similarly, the capacitances of electrodes 4' and 5' control the potentials of plates 20' and 21', respectively, and the cathode-ray beam moves approximately in the same direction as the conductor 6 no matter what that direction may be.

With linear amplification the deflection of the cathode-ray beam is not a linear function of the amount of displacement of the conductor 6 from its central position, since the capacitance of any one of the electrodes 4, 5, 4', 5', with respect to the conductor 6 of the cable 3 is not a linear function of the distance between them. However, such distortion as is present is not important in the uses for which the apparatus is intended. Non-linear amplification may be used to reduce the distortion to any desired minimum.

The purpose of rectifying the outputs of the bridges is to produce steady potentials on the deflection plates 20, 21, 20', 21' of the oscillograph. Rectification could be dispensed with, but the fluorescent spot on the screen of the oscillograph would then be drawn out into a line when the conductor 6 of the cable 3 was off center, and the exact location of the conductor 6 would not be indicated. For instance, displacements of the conductor 6 along a vertical line by equal amounts either up or down, would produce the same pattern on the screen of the oscillograph.

Resistors 22, 23 and 22', 23' are used as a convenient means of maintaining points 24 and 24' respectively, at the same potentials as the control grids of the amplifying tubes 18, 19, 18', 19' when the bridges are balanced. Capacitors 25, 25' are inserted in the circuit to suppress oscillations in the amplifiers 18, 19, 18', 19' and may not always be necessary. Grid bias, screen, and plate potentials are obtained from batteries 26, 26', 27, 27', 28, 28'. They may be replaced by suitably designed power supply circuits to operate from available alternating current. Resistances 29, 30, 29', 30' are the plate resistors of the amplifying tubes 18, 19, 18', 19'.

Capacitors 31, 32, 31', 32' are the customary capacitances used in rectifying circuits to suppress ripple in the rectified voltage. These capacitors, together with the resistors 33, 34, 33', 34', control to a large extent the time constants of the circuit. The faster the cable 3 is drawn through the electrodes 4, 5, 4', 5', the lower must be the time constants.

Registration of the location of the conductor 6 within the cable 3 may be obtained by taking a moving picture record of the spot on the screen of the oscillograph, or by recording the potentials of points 14, 15, 14', 15', with or without amplification and rectification, with potential recorders.

Means for painting or otherwise marking portions of the cable 3 wherein the conductor 6 is not properly centered, may be controlled by relays actuated directly by the potentials of the points 14, 15, 14', 15' with or without amplification or rectification, or by relays actuated by a photoelectric-cell or cells so arranged that they are actuated when the fluorescent spot on the screen of the oscillograph leaves its central position.

Similarly, in the process of fabricating the cable 3, the position of the conductor 6 may be automatically controlled by relays actuated by the potentials of points 14, 15, 14', 15', or by photoelectric cells.

The invention described herein may be manufactured and used by or for the Government of the United States of America for governmental purposes without the payment of any royalties thereon or therefor.

What we claim is:

1. An apparatus for determining the position of the conductor in an insulated cable, comprising; two pairs of electrodes, the electrodes of each pair being placed on opposite sides of the cable, said electrodes in the aggregate forming a hollow segmented cylinder through which the cable may be drawn, a bridge circuit connecting the electrodes of each pair with oppositely located deflection plates of a cathode-ray oscillograph, the relative positions of said deflection plates being the same as those of their corresponding electrodes, and means in said bridge circuits to vary the potential of each deflection plate in proportion to changes of capacity between its corresponding electrode and the conductor, whereby the cathode-ray beam will move in a corresponding direction and in an amount proportional to lateral movement of the conductor in the cable.

2. An apparatus for determining the position of the conductor in an insulated electrical cable, comprising a source of alternating power arranged to energize two electrical bridges, the sides of each of said bridges consisting of an electrical resistance and the capacitance between the conductor and an electrode in spaced relation to said cable, and having a variable capacitor in parallel with said capacitance, rectifying means for converting the potential originating in each of said sides of said bridges to direct current potential; a cathode-ray oscillograph, means connecting the opposite sides of each of said bridges to a pair of the deflection plates of said oscillograph, and amplifying means for raising said potentials to values sufficient to operate said deflection plates.

3. An apparatus for determining the position of the conductor in an insulated electrical cable, comprising two electrical bridges, a source of alternating power arranged to energize said bridges, the sides of each of said bridges consisting of an electrical resistance and the capacitance between the said conductor and an electrode in spaced relation to said cable, and a variable capacitor in parallel with said capacitance; rectifying means for converting the potential originating in each of said sides of said bridges to direct current, a cathode-ray oscillograph, means connecting the opposite sides of each of said bridges to a pair of the deflection plates of said oscillograph, and amplifying means for raising said potentials to values sufficient to operate said deflection plates, whereby the position of the fluorescent spot on the screen of said oscillograph will indicate the position of said conductor in said cable.

MELVILLE F. PETERS.
THEODORE B. GODFREY.